US008885577B2

(12) United States Patent
Narasimha (10) Patent No.: US 8,885,577 B2
(45) Date of Patent: Nov. 11, 2014

(54) METHOD OF ASSIGNING AND MANAGING GAPS FOR READING SYSTEM INFORMATION OF NEIGHBORING CELLS

(75) Inventor: Murali Narasimha, Lake Zurich, IL (US)

(73) Assignee: Motorola Mobility LLC, Libertyville, IL (US)

( * ) Notice: Subject to any disclaimer, the term of this patent is extended or adjusted under 35 U.S.C. 154(b) by 488 days.

(21) Appl. No.: 12/791,329

(22) Filed: Jun. 1, 2010

(65) Prior Publication Data

US 2010/0322169 A1 Dec. 23, 2010

Related U.S. Application Data

(60) Provisional application No. 61/219,761, filed on Jun. 23, 2009.

(51) Int. Cl.
*H04W 4/00* (2009.01)
*H04J 3/06* (2006.01)
*H04W 36/00* (2009.01)
*H04W 72/04* (2009.01)
*H04W 48/12* (2009.01)

(52) U.S. Cl.
CPC ...... *H04W 72/0493* (2013.01); *H04W 36/0088* (2013.01); *H04W 72/0406* (2013.01); *H04W 48/12* (2013.01)
USPC .......................................... 370/329; 370/350

(58) Field of Classification Search
USPC .......................... 370/328, 329, 338, 350, 503
See application file for complete search history.

(56) References Cited

U.S. PATENT DOCUMENTS

| | | | | |
|---|---|---|---|---|
| 7,688,799 B2* | 3/2010 | Yamamoto | | 370/345 |
| 2003/0007470 A1* | 1/2003 | Grilli et al. | | 370/335 |
| 2003/0210713 A1* | 11/2003 | Abdel-Ghaffar | | 370/503 |
| 2004/0053614 A1* | 3/2004 | Il-Gyu et al. | | 455/436 |
| 2005/0195769 A1* | 9/2005 | Kaewell et al. | | 370/335 |
| 2006/0223557 A1 | 10/2006 | Manohar | | |
| 2007/0037601 A1 | 2/2007 | Mittal et al. | | |
| 2007/0097914 A1 | 5/2007 | Grilli et al. | | |
| 2008/0274742 A1* | 11/2008 | Bi | | 455/437 |

(Continued)

FOREIGN PATENT DOCUMENTS

| EP | 1574095 B1 | 10/2006 |
|---|---|---|
| EP | 1909523 A1 | 4/2008 |

OTHER PUBLICATIONS

Motorola, Inc.; "PCID confusion"; R2-092307, 3GPP TSG-RAN WG2#65bis; Mar. 23-27, 2009; pp. 1-3; Seoul, Korea.

*Primary Examiner* — Warner Wong
(74) *Attorney, Agent, or Firm* — Faegre Baker Daniels LLP (57) ABSTRACT

A method in a mobile station for receiving system information of a neighbor cell, and a corresponding method in a base station transmits an assignment of a gap sequence and an assignment of an acknowledgement resource allocation sequence from a serving cell. The mobile station uses the gap sequence to attempt to receive a system information message (e.g., MIB) of a neighbor cell. If the system information message is successfully decoded, the mobile station transmits an acknowledgement to the serving cell and both the mobile station and the serving cell discontinue the gap sequence and the acknowledgement resource allocation sequence. The gap sequence (and discontinuing the gap sequence) allows fewer subframes to be used by the mobile station to search for system information messages.

18 Claims, 6 Drawing Sheets

(56) References Cited

U.S. PATENT DOCUMENTS

| | | | |
|---|---|---|---|
| 2009/0022062 A1* | 1/2009 | Wang et al. | 370/252 |
| 2009/0046672 A1* | 2/2009 | Malladi et al. | 370/336 |
| 2009/0274086 A1* | 11/2009 | Petrovic et al. | 370/312 |
| 2009/0316654 A1* | 12/2009 | Prakash et al. | 370/331 |
| 2010/0074170 A1* | 3/2010 | Chen | 370/328 |
| 2010/0260155 A1* | 10/2010 | Grilli et al. | 370/336 |
| 2012/0003981 A1* | 1/2012 | Krishnamurthy et al. | 455/450 |
| 2012/0082054 A1* | 4/2012 | Gholmieh et al. | 370/252 |

* cited by examiner

METHOD OF ASSIGNING AND MANAGING GAPS FOR READING SYSTEM INFORMATION OF NEIGHBORING CELLS

FIELD OF DISCLOSURE

The present disclosure relates generally to wireless communications, and more specifically to reading system information of neighboring cells.

BACKGROUND

A mobile station (sometimes called User Equipment or "UE"), in a cellular network that is connected to a serving cell, normally does not read system information transmitted by a neighbor cell. There are several situations, however, where a UE having an ability to read a neighbor cell's system information might be useful. Some of these situations are described below.

(1) To enable handover to a Third Generation Partnership Project (3GPP) Long Term Evolution (LTE) Home enhanced Node-B (HeNB): A serving cell may not be able to determine the correct target cell using only the physical cell identity (PCID) reported to the serving cell in a measurement report sent by the mobile station to the serving cell. In this case the mobile station may benefit from reading system information from neighbor cells to obtain an additional identifier (e.g. CSG ID, cell global ID) of the target cell.

(2) Self Optimized Networks: Networks are moving to a self organization/self optimization model. With increasingly complex networks (e.g., relays in LTE-advanced), mobile stations may be expected to read and report system information of neighbor cells.

(3) Drive test minimization: There is an ongoing effort in standards bodies such as 3GPP to define mobile station measurements and procedures to reduce the need for drive testing to optimize network parameters. This is likely to expect mobile stations to read system information of neighbor cells.

(4) Knowing a downlink bandwidth of a target cell may allow a UE to make more accurate measurements and improve handover performance. In LTE, the downlink bandwidth is transmitted in the Master Information Block, which is a format for system information.

(5) Knowing the System Frame Number (SFN) of a target cell, random access channel configuration information of the target cell, and other system information of the target cell before a handover would be beneficial in reducing handover interruption. SFN is transmitted in a Master Information Block (MIB) and the random access channel configuration information is transmitted in a System Information Block 2 (SIB2).

(6) In general, knowing neighbor cell system information can facilitate a quick recovery in case of a handover failure or a radio link failure.

If adequate idle periods are available in connected mode (DRX periods), a mobile station can autonomously read neighbor cell system information. However system information messages are repeated relatively infrequently (80 ms periodicity for SIB1, 160 ms for SIB2, and so on). The mobile station may need to receive multiple transmissions of a system information message before it can successfully decode the message. The mobile station may be unable to find such extended idle periods. Alternatively, the mobile station could be assigned a measurement gap to tune to the neighbor cell and obtain the neighbor cell's system information. During this assigned measurement gap, the serving cell would not schedule any transmissions for the mobile station. Such a measurement gap, however, would have to be very long because reading MIB and SIB1 alone—which is a pre-requisite for reading other SIBs—can require a measurement gap of up to 160 ms. Such long gaps cause significant interruption to the mobile station's connection to the serving cell.

Therefore, it would be beneficial to have other mechanisms to acquire the system information of neighboring cells while reducing interruptions to the connection between the mobile station and the serving cell.

DETAILED DESCRIPTION

A method of assigning and managing gaps for reading system information of neighboring cells allows a mobile station to acquire system information of neighboring cells with reduced interruptions to the connection between the mobile station and its serving cell. The embodiments are described in terms of a 3GPP Long term Evolution (LTE) system; however, it should be clear that the invention and the embodiments are equally applicable to other wireless communication systems. It is assumed that the serving cell knows the frame timing difference between itself and the target neighbor cell whose system information will be read by the mobile station. The frame timing difference can be provided to the serving cell in a measurement report by a mobile station that has measured the frame timing difference. Such a mobile station may or may not be seeking a handover to the target cell. Furthermore, a serving cell may be any one of the cells with which the mobile station has a communication link (for example, in a communication network using coordinated multipoint base stations, the serving cell may be one of the coordinated multipoint base stations to which the mobile station has a communication link).

Figure 1A:
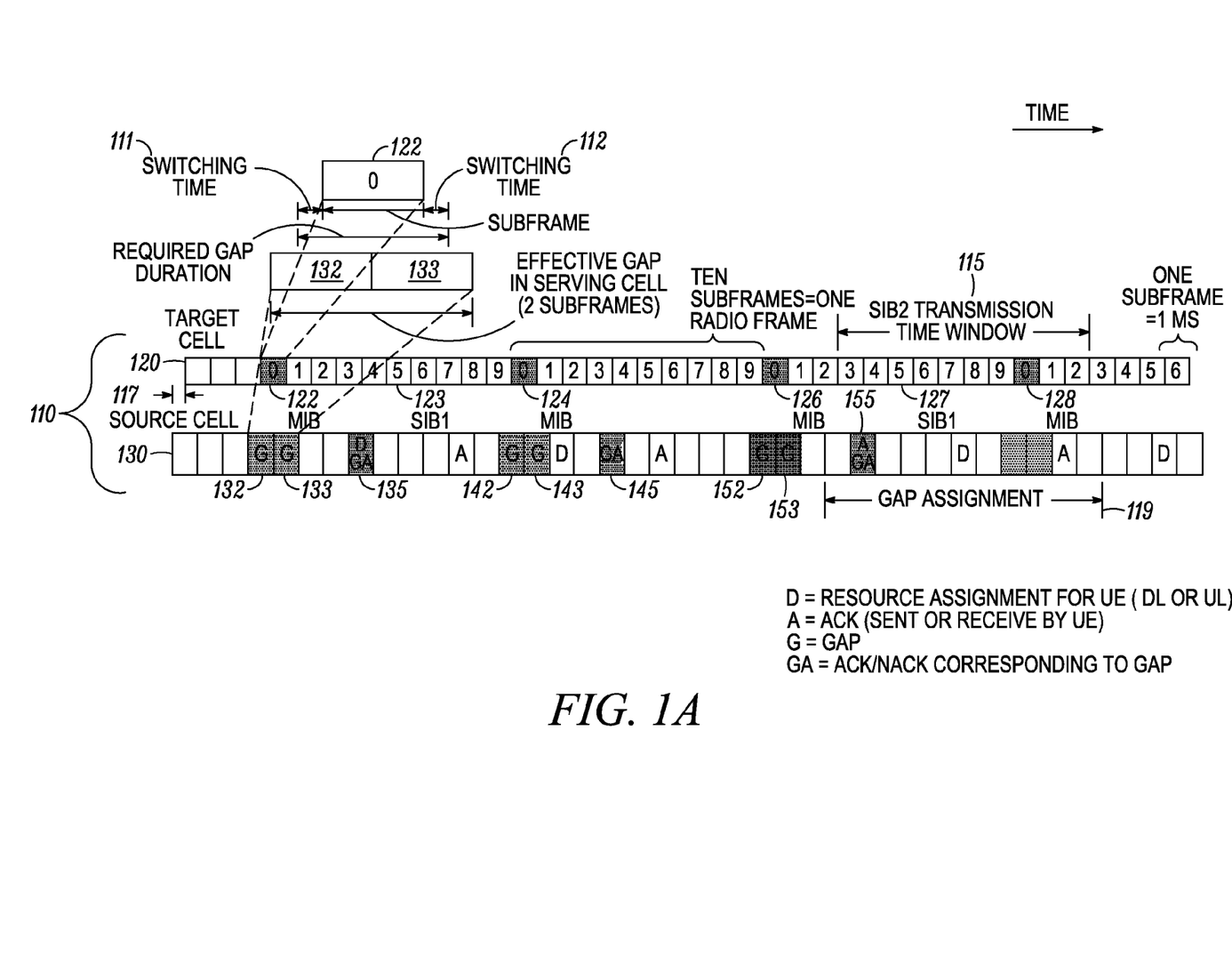
FIGS. 1A and 1B show two sample timing diagrams.
Figure 1B:
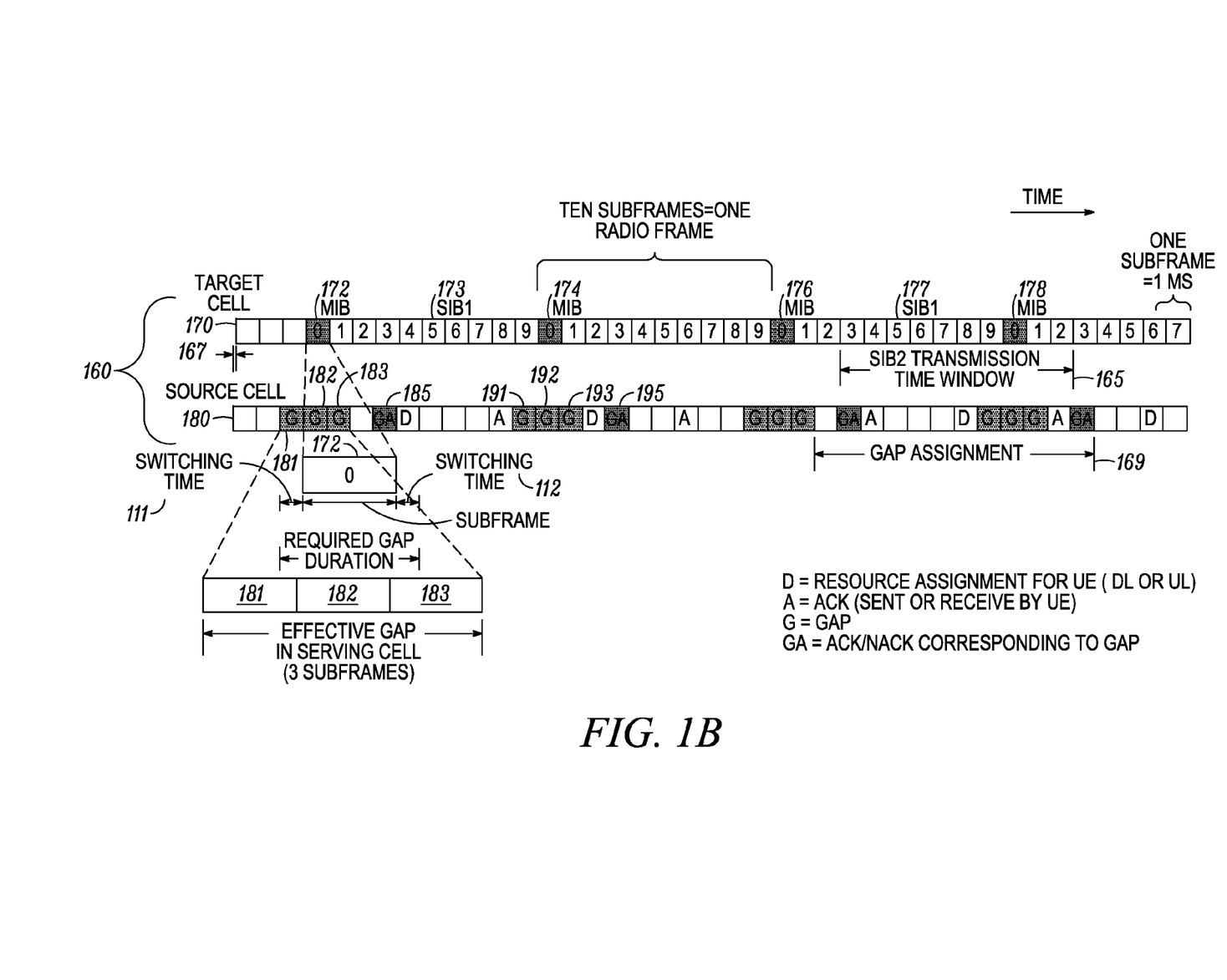

FIGS. 1A and 1B show two sample timing diagrams 110, 160. In the first sample timing diagram 110 of FIG. 1A, a first row represents subframes 120 transmitted by a target neighbor cell and a second row represents subframes 130 transmitted by a source (or serving) cell. Within the stream of target cell subframes 130, groups of ten subframes create a radio frame. A master information block (MIB) is transmitted in each subframe 0 of a radio frame 122, 124, 126, 128. A MIB contains scheduling information for other system information blocks as well as the network identity (PLMN) of the cell. A system information block 1 (SIB1) is transmitted in every other subframe 5 of a radio frame 123, 127. Other subframes may contain scheduled system information blocks (SIB2, SIB3, SIB4, etc.). MIB and SIB1 information is used to determine a transmission time window 115 in which to seek a scheduled system information block. According to LTE, this transmission time window can be between 1-40 milliseconds.

With a frame timing difference 117 greater than a receiver-to-transmitter switching time 111, two source cell subframes 132, 133 are needed to receive a single target cell subframe 122. This assumes that the receiver-to-transmitter switching time 111 plus the transmitter-to-receiver switching time 112 is less than one subframe (i.e., 1 millisecond in this embodiment). If the first attempt to receive a single target cell subframe 122 containing a MIB is unsuccessful, there are further opportunities (one opportunity each radio frame) to receive MIB transmissions 124, 126, 128. A source cell may allocate a sequence of gap subframes G 132, 133, 142, 143, 152, 153, in which to attempt to receive MIB transmissions. After a MIB is successfully received, the mobile station can send an acknowledgement which suspends the gap sequence and allows the source cell to reallocate the gaps for other purposes. To enable this situation, the source cell also allocates gap-acknowledgement GA subframes 135, 145, 155 when the mobile station may send an acknowledgement.

If the mobile station is also seeking SIB1 information, a similar approach may be used to assign gap subframes at the source cell so that the mobile station has time to search for a SIB1 during subframe 5 of every other radio frame. In this situation, after an acknowledgement is sent by the mobile station (indicating successful decoding of a MIB), both the mobile station and the source cell shift the gap sequence to allow the mobile station to search for the SIB1 123, 127. The gap sequence may simply be shifted five milliseconds forward in time (if the mobile station and the base station do not know whether odd radio frames or even radio frames of the target cell are carrying the SIB1) or the gap sequence may be shifted five milliseconds forward in time and halved in periodicity (if the mobile station and the base station know whether the SIB1 is on odd or even radio frames of the target cell).

In the first example timing diagram 110, the gap sequence was discontinued after gap subframe 153, which indicates that the source cell reallocated the gap subframes after the mobile station successfully acknowledged receipt of a MIB (probably MIB 126). In other examples, after acknowledgement of successful receipt of a MIB, the gap subframes would be shifted so that the mobile station could search for SIB1.

Turning to FIG. 1B with the second example timing diagram 160, a frame timing difference 167 less than a receiver-to-transmitter switching time 111 requires three source cell subframes 181, 182, 183 to receive a single target cell subframe 172. If the first attempt to receive a single target cell subframe 172 containing a MIB is unsuccessful, there are further opportunities (one opportunity each radio frame) to receive MIB transmissions 174, 176, 178. A source cell may allocate a sequence of gap subframes G 181, 182, 183, 191, 192, 193, in which to attempt to receive MIB transmissions. After a MIB is successfully received, the mobile station can send an acknowledgement which suspends the gap sequence and allows the source cell to reallocate the gaps for other purposes. To enable this situation, the source cell also allocates gap-acknowledgement GA subframes 185, 195 when the mobile station may send an acknowledgement.

If the mobile station is also seeking SIB1 information, after an acknowledgement is sent by the mobile station (indicating successful decoding of a MIB), both the mobile station and the source cell shift the gap sequence to allow the mobile station to search for the SIB1 173, 177. The gap sequence may simply be shifted five milliseconds forward in time (if the mobile station and the base station do not know whether odd radio frames or even radio frames of the target cell are carrying the SIB1) or the gap sequence may be shifted five milliseconds forward in time and halved in periodicity (if the mobile station and the base station know whether the SIB1 is on odd or even radio frames of the target cell).

Figure 2:
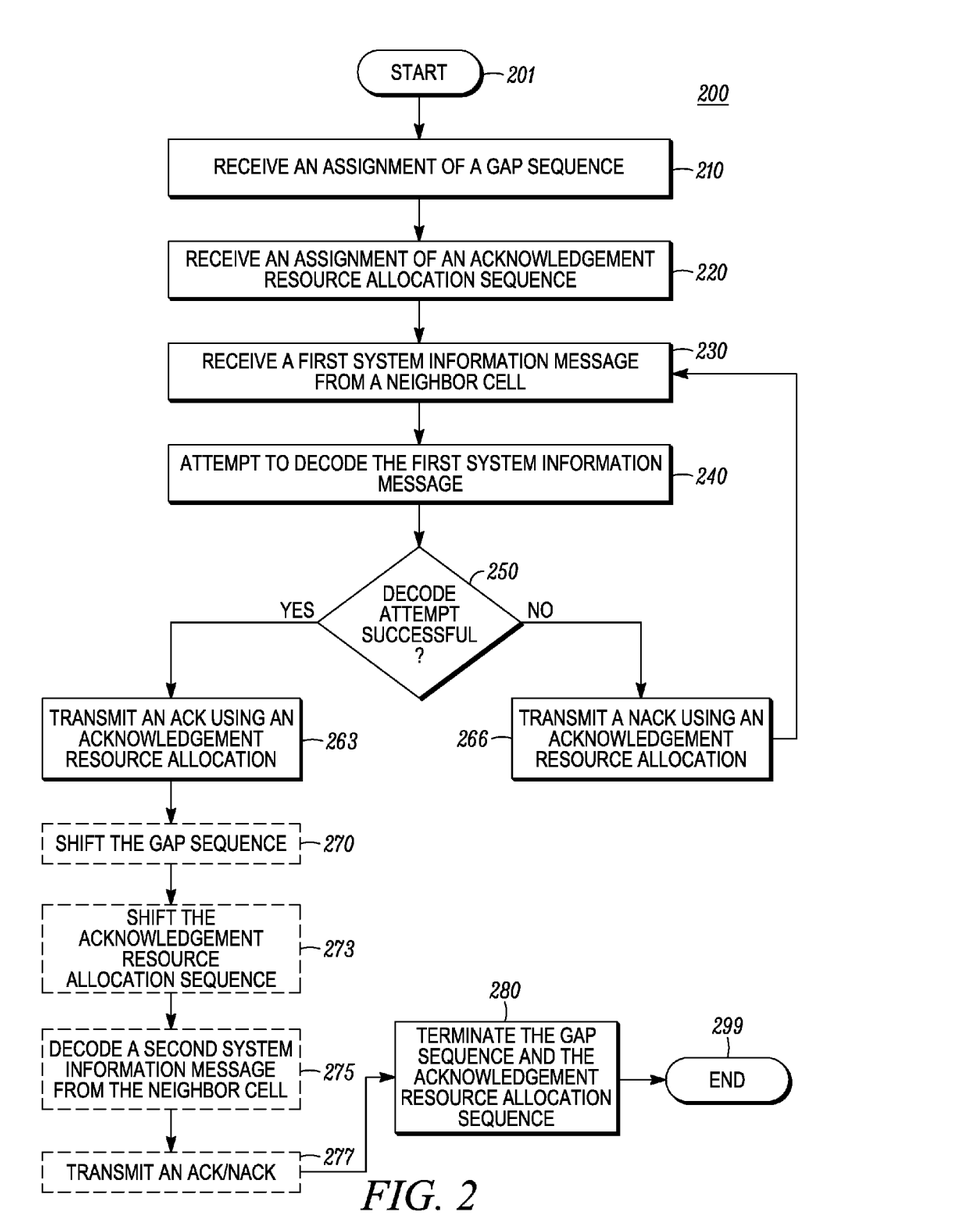
FIG. 2 illustrates a method in a mobile station for receiving MIB and SIB1 system information from neighbor cells using synchronized gaps in accordance with an embodiment.
Figure 3:
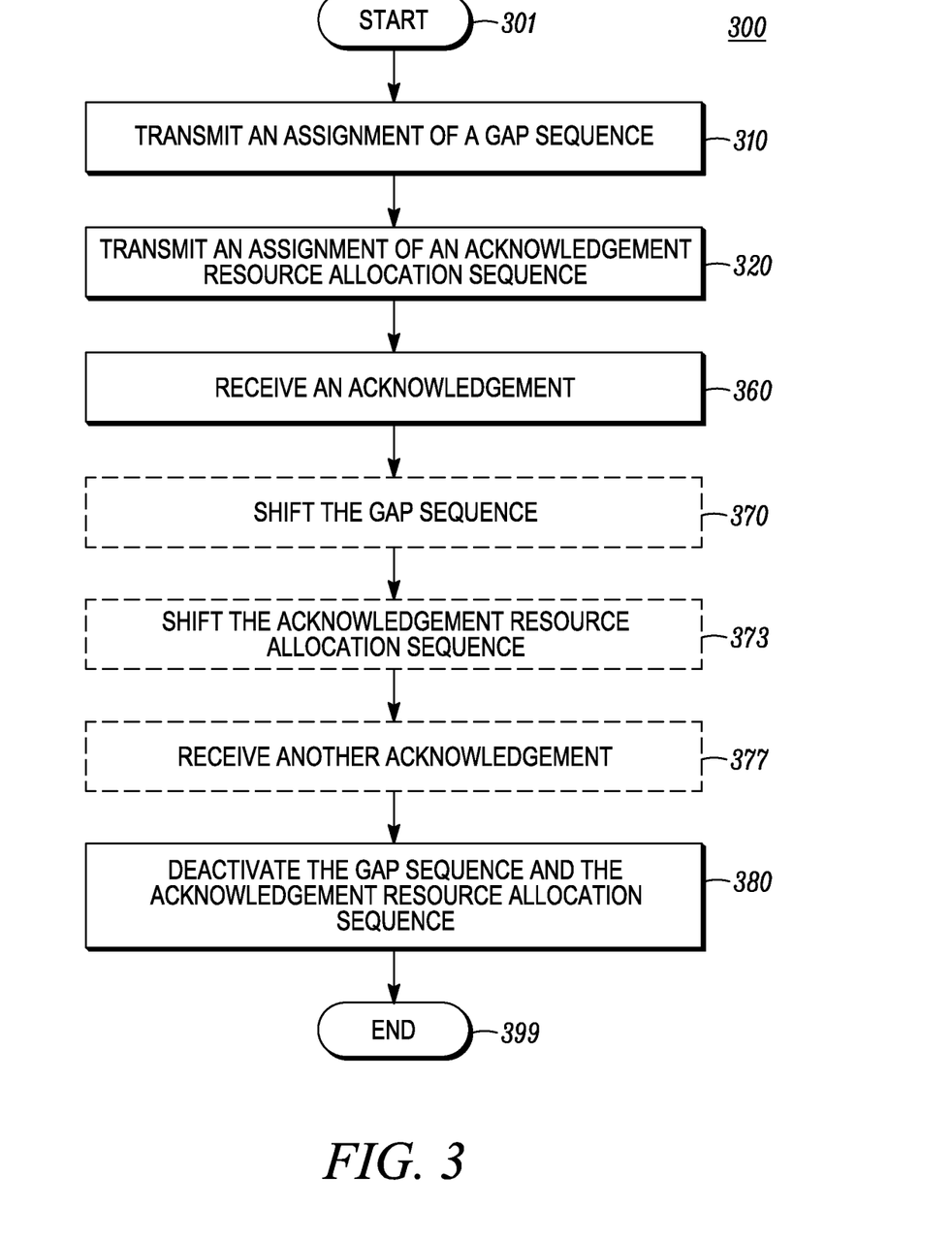
FIG. 3 illustrates a method in a base station for receiving MIB, and optionally SIB1, system information from neighbor cells using synchronized gaps in accordance with an embodiment.

FIG. 2 illustrates a flowchart 200 for a method in a mobile station for receiving MIB and SIB1 system information from neighbor cells using synchronized gaps in accordance with an embodiment. FIG. 3 illustrates a flowchart 300 for a method in a base station for receiving a MIB, and optionally SIB1, system information from neighbor cells using synchronized gaps in accordance with an embodiment. At the start 201, 301 a serving cell notifies a particular mobile station that it should acquire system information from a particular neighbor cell.

The serving cell assigns two series of gap subframes to the mobile station as follows:

a. Gaps are 2 ms or 3 ms long and are timed to cover subframe 0 of the target cell (the 3 ms gaps may be needed in some cases based on timing as shown in FIG. 1 timing diagram 160). Subframe 0 of the target cell contains the MIB. The repeating sequence of gap subframes are called a gap sequence.

b. Ack/Nack resources are assigned to the mobile station corresponding to the gap sequence. The repeating sequence of gap-acknowledgement subframes are called an acknowledgement resource allocation sequence. This acknowledgement resource allocation sequence can correspond directly to the gap sequences as follows:

i. In an FDD system (serving cell is an FDD cell) if the gap starts in subframe n of serving cell, Ack/Nack resource is in subframe n+4. Alternatively the Ack/Nack resource could be in subframe n+3 or other subframes also.

ii. For TDD the Ack/Nack subframe is determined based on the UL/DL pattern.

The base station transmits 310 and the mobile station receives 210 an assignment of the gap sequence. The base station also transmits 320 and the mobiles station also receives 220 an assignment of the acknowledgement resource allocation sequence. These two transmissions and receptions can be received in any order or combined into a single assignment message.

The mobile station tries to receive 230 a MIB and attempts to decode 240 the received MIB, and the mobile station provides feedback using an ACK/NACK indication on the ACK/NACK resources assigned to the mobile. during the gap-acknowledgement subframe. If the mobile station successfully decodes 250 the MIB, the UE sends an Ack 263; otherwise the mobile station sends a Nack 266 and seeks to receive 230 another transmission of the MIB.

If the mobile station sends an ack that is successfully received 360 at the base station, the gap sequence and the acknowledgement resource allocation sequence can be deactivated 280, 380 at the mobile station and base station, and the procedure can end 299, 399 at this point. Alternatively, the gap sequence can be shifted 270, 370 in time by 5 milliseconds to cover subframe 5 of the target cell. Subframe 5 of the target cell contains the System Information Block 1 (SIB1). Consequently the acknowledgement resource allocation sequence should also be shifted 273, 373 in time by 5 milliseconds.

The mobile station then tries to receive SIB1 and decode 275 the received SIB1 and provides feedback 277 using an ACK/NACK indication on the ACK/NACK resources assigned to the mobile. If successful the mobile station sends an Ack, otherwise a Nack.

If the mobile station sends 277 an ack after reading SIB1 and the base station successfully receives 377 the second acknowledgement, the gaps are stopped 280, 380 and the procedure ends 299, 399. When the procedure is completed, the base station may allocate the subframes without regarding to gap sequences or acknowledgement resource allocation sequences and the serving base station and mobile station may transmit and receive normally scheduled data.

The flowcharts 200, 300 described above allow a network operator to implement periods when the mobile station is inaccessible to the serving cell that are short and are quickly disabled once the mobile station acquires the relevant system information. This promotes minimal impact to ongoing communication between the mobile station and the serving cell.

Figure 4:
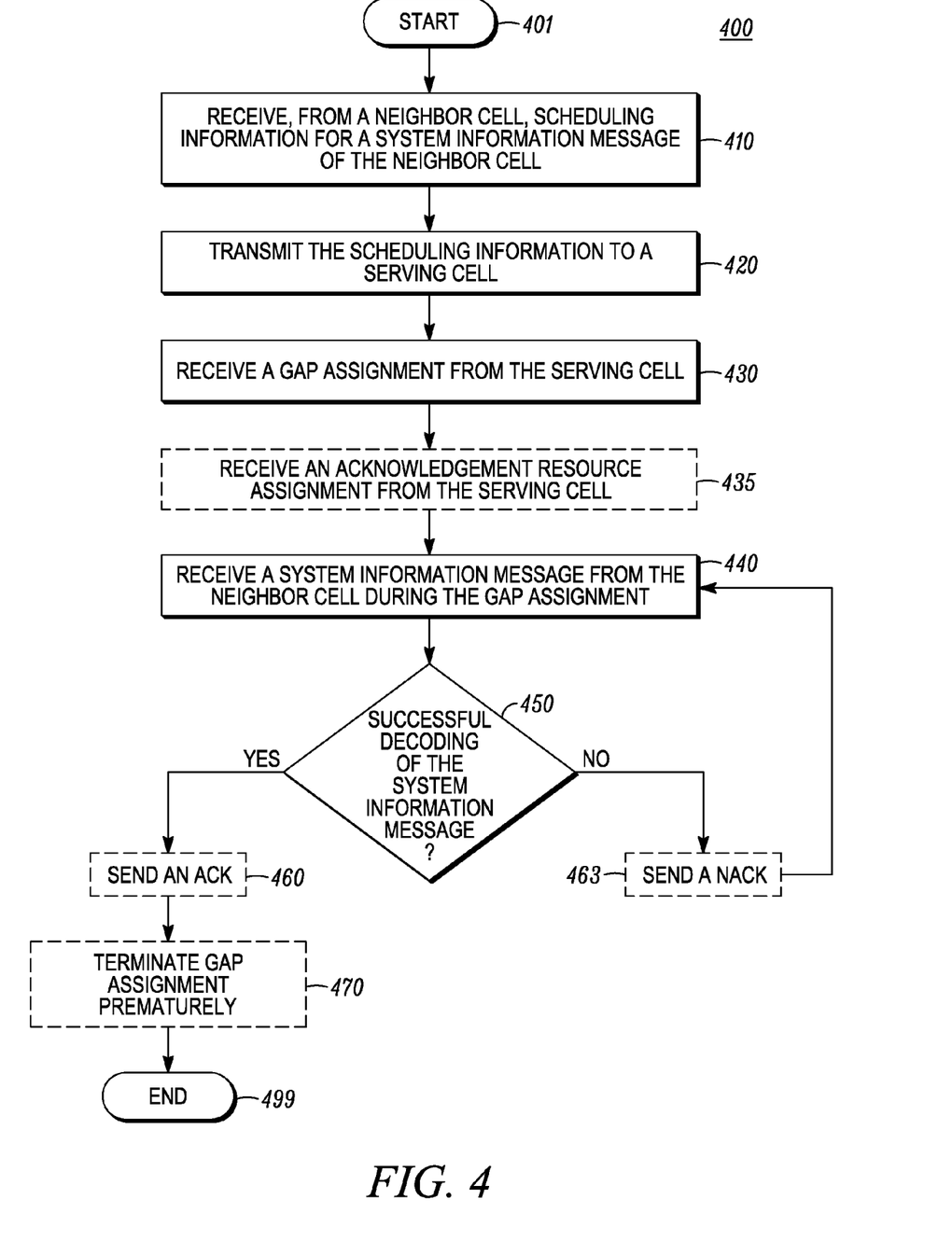
FIG. 4 illustrates a method in a mobile station for receiving SIB2 system information from neighbor cells using synchronized gaps in accordance with an embodiment.
Figure 5:
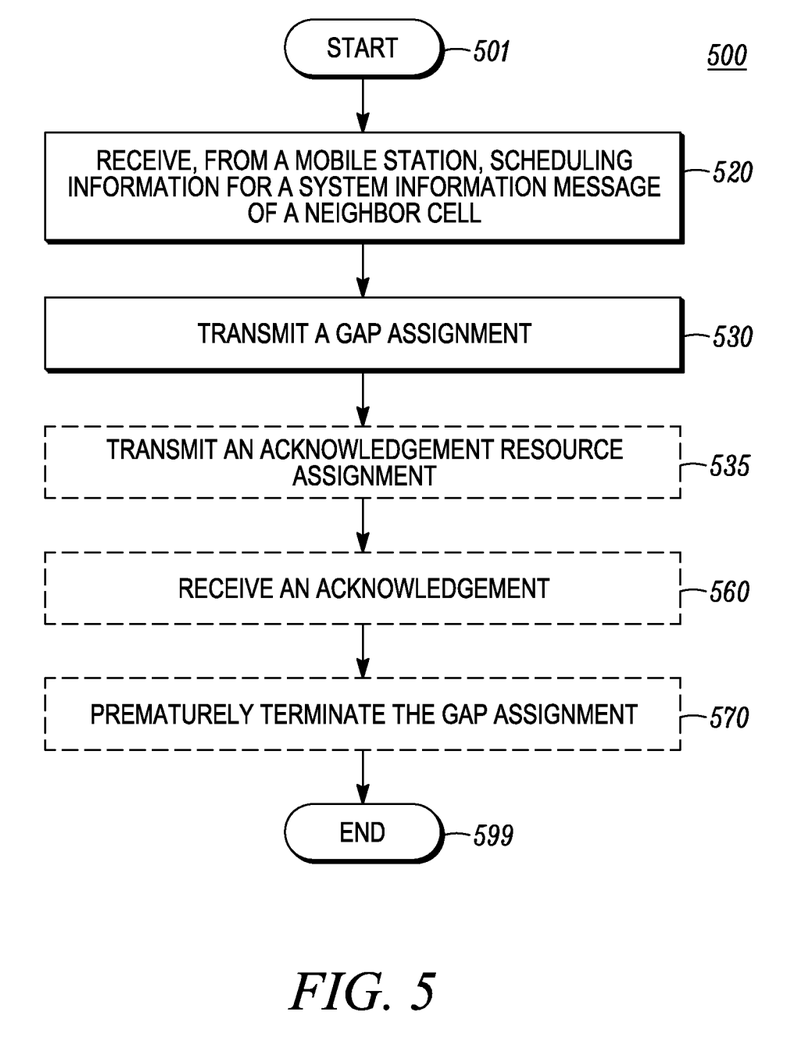
FIG. 5 illustrates a method in a base station for receiving SIB2 system information from neighbor cells using synchronized gaps in accordance with an embodiment.

FIG. 4 illustrates a flowchart 400 for a method in a mobile station for receiving SIB2 system information from neighbor cells using synchronized gaps in accordance with an embodiment. FIG. 5 illustrates a flowchart 500 for method in a base station for receiving SIB2 system information from neighbor cells using synchronized gaps in accordance with an embodiment. The embodiments shown in FIG. 4 and FIG. 5 enable a mobile station to acquire system information messages that are not transmitted at pre-determined times. Such system information messages include system information blocks 2 through 8 defined in the LTE Release 8 specification. Although we use SIB2 in these examples, any scheduled system information can be obtained using these methodologies. In some instances, the transmission time window for these types of system information messages can range from 1 to 40 milliseconds.

In the flowcharts of FIG. 4 and FIG. 5, it is assumed that the UE has acquired the scheduling information for the other system information messages at the start 401, 501. The scheduling information is provided in SIB1 in LTE and includes a ten millisecond transmission time window 115, 165 (FIG. 1) during which scheduled SIBs are transmitted. The SIB1 can be acquired in accordance with the flowcharts of FIG. 2 and FIG. 3 or the SIB1 can be acquired using a previously-known method, such as a single extended measurement gap. The following steps are performed upon determining that the UE needs to acquire a particular system information message of the neighbor cell. The determination that a particular system information message should be acquired could be performed at the mobile station or in the network:

The mobile station receives 410, from a neighbor cell, scheduling information for a system information message of a neighbor cell and reports 420, to the serving cell, the scheduling information for the particular system information message of the neighbor cell. The scheduling information can be the transmission time window 115, 165 (FIG. 1) as received from a SIB1 of a neighbor cell.

The serving cell receives 520 the scheduling information and assigns 530 a gap to the mobile station that covers at least a part of the transmission time window during which the particular system information message (e.g., SIB2) is transmitted by the neighbor cell. Referring to FIG. 1, the transmission time window 115 for SIB2 in the first time sequence 110 is ten milliseconds long. Consequently, the gap assignment 119 could be eleven subframes in length and designed to overlap completely with the transmission time window 115 for SIB2. Looking at the second example time sequence 160, a full gap assignment 169 would require twelve subframes to completely overlap the transmission time window 165 due to the small frame timing difference 167. Alternately, the gap assignment could be a subset of a full gap assignment and overlap only partially with the transmission time window 115, 165. Also, the gap assignment could be greater than a full gap assignment 119, 169.

The mobile station receives 430 the gap assignment and attempts to receive 440 the scheduled system information message from the neighbor cell during the assigned gap. Because, in some LTE Release 8 implementations, the target base station can dynamically schedule a system information message (e.g., SIB2) one or more times, the mobile station may combine multiple receptions of the system information message to improve reception performance.

Long transmission time windows for system information messages can cause significant interruptions because a mobile station would be inaccessible to the serving cell for the duration of the window. Therefore, if a mobile station is able to decode the message before the end of the transmission time window, it is beneficial to terminate the gap. So optional steps allow for early termination of the gap assignment.

In addition to transmitting 530 a gap assignment, the base station can also transmit an assignment of a series of acknowledgement resources 535 through the duration of the gap assignment. In other words, some of the gap assignment subframes can be used by the mobile station for Ack/Nack messages. The acknowledgement resource assignment message may be part of the gap assignment message.

If the mobile station successfully decodes 450 the system information message, it sends 460 an acknowledgement using the next available acknowledgement resource in the series of assigned acknowledgement resources. Note that the mobile station may combine more than one reception of the system information message to successfully decode the message before sending an acknowledgement.

If the serving eNB receives 560 an acknowledgement before the end of the gap assignment, it terminates the gap assignment prematurely. Meanwhile, the mobile station also terminates 470 the gap assignment prematurely. This ends 499, 599 the procedure and enables the serving eNB to resume normal communication with the mobile station. Note that as a further enhancement, a mobile station may send 463 a Nack in an acknowledgement resource to request the serving cell to extend the gap via provision of another gap assignment and return to receiving 440 a retransmission of the system information message.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . .

a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may utilize one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method in a mobile station for receiving system information of a neighbor cell, comprising:

receiving, from a serving cell, a message notifying the mobile station to acquire system information of the neighbor cell, wherein the message indicates an identifier of the neighbor cell;

scheduling a gap sequence including synchronized gaps, wherein synchronized gaps of the gap sequence are scheduled to overlap transmissions of a system information message by the neighbor cell, wherein one or more of the synchronized gaps is used to receive the system information message, the system information message including one or more parameters for opening in the neighbor cell, wherein the system information further includes at least a cell global ID;

receiving, from the neighbor cell, the system information message during a gap of the gap sequence; and transmitting, to the serving cell, a message indicating that the system information message has been received.

2. The method according to claim 1 wherein a gap of the gap sequence overlaps at least a part of a system information message transmission by the neighbor cell.

3. The method according to claim 1 wherein the receiving, from a serving cell comprises:

receiving an assignment of the gap sequence.

4. The method according to claim 1 further comprising, after the receiving, from a serving cell:

receiving, from the serving cell, an assignment of an acknowledgement resource allocation sequence; and wherein the transmitting, to the serving cell, comprises:

transmitting an ACK/NACK using an acknowledgement resource of the acknowledgement resource allocation sequence.

5. The method according to claim 4 wherein the acknowledgement resource of the acknowledgement resource allocation sequence occurs after a pre-determined time period after an end of the gap.

6. The method according to claim 4 wherein the transmitting the ACK/NACK comprises:

failing to decode the system information message; and transmitting a negative acknowledgement to the serving cell.

7. The method according to claim 1 further comprising:

shifting the gap sequence by a predetermined duration to create a shifted gap sequence; and attempting to decode a second system information message from the neighbor cell during a gap of the shifted gap sequence.

8. The method according to claim 1 wherein system Information further includes at least one of a CSG ID or system frame number (SFN).

9. The method according to claim 1 further comprising, after the transmitting, to the serving cell, a message:

terminating the gap sequence after transmitting the message.

10. A method in a mobile station for receiving system information of a neighbor cell, comprising:

receiving, from the neighbor cell, a scheduling information for a system information message of the neighbor cell, wherein the scheduling information indicates a time window for transmission of the system information message, wherein the system information includes at least a cell global ID;

transmitting, to a serving cell, the scheduling information;

receiving, from the serving cell, a gap assignment scheduled to overlap at least in part a time window for transmission of the system information message;

receiving the system information message during the gap assignment; and transmitting, to the serving cell, a message indicating that the system information message has been received.

11. The method according to claim 10 wherein the gap assignment further includes an acknowledgement resource assignment.

12. The method according to claim 11 further comprising: sending an ACK in response to successfully decoding the system information message.

13. The method according to claim 10 wherein the scheduling information includes a transmission time window.

14. A method in a base station comprising:
transmitting, to a mobile station, an assignment of a gap sequence including synchronized transmitting, to a mobile station, an assignment of a gap sequence including synchronized gaps, wherein synchronized gaps of the gap sequence are scheduled to overlap transmissions of a system information message by a neighbor base station, wherein one or more of the synchronized gaps is used to receive the system information message, the system information message including one or more parameters for operating in the neighbor cell, wherein the system information further includes at least one of a CSG ID, cell global ID, system frame number (SFN), or random access channel (RACH) configuration information;
receiving, from the mobile station, a message indicating that the mobile station has received the system information message from the neighbor base station; and
deactivating the gap sequence in response to the receiving, from the mobile station, a message.

15. The method according to claim 14 further comprising:
transmitting, to the mobile station, an assignment of an acknowledgement resource allocation sequence, wherein an acknowledgement resource of the acknowledgement resource allocation sequence occurs after a pre-determined time period after an end of a gap.

16. The method according to claim 15 further comprising after the receiving, from the mobile station, a message:
shifting the gap sequence by a predetermined duration to create a shifted gap sequence; and
shifting the acknowledgement resource allocation sequence by the predetermined duration to create a shifted acknowledgement resource allocation sequence.

17. The method according to claim 16 further comprising:
receiving, from the mobile station, an acknowledgement during an acknowledgement resource of the shifted acknowledgement resource allocation sequence; and
deactivating the acknowledgement resource allocation sequence in response to the receiving, from the mobile station, an acknowledgement.

18. The method according to claim 16 wherein a gap of the shifted gap sequence overlaps the transmission of another system information message by the neighbor base station.

* * * * *

UNITED STATES PATENT AND TRADEMARK OFFICE
CERTIFICATE OF CORRECTION

PATENT NO.        : 8,885,577 B2
APPLICATION NO.   : 12/791329
DATED             : November 11, 2014
INVENTOR(S)       : Murali Narasimha It is certified that error appears in the above-identified patent and that said Letters Patent is hereby corrected as shown below:

In the Claims

In claim 1, column 8, line 11, "opening" should be replaced with "operating"

and

In Claim 14, column 9, lines 13-15, please delete the phrase

"transmitting, to a mobile station, an assignment of a gap sequence including synchronized"

Signed and Sealed this
Twenty-first Day of April, 2015

Michelle K. Lee
*Director of the United States Patent and Trademark Office*